United States Patent
Hassler et al.

(12)

(10) Patent No.: US 11,196,299 B2
(45) Date of Patent: Dec. 7, 2021

(54) PRIMARY UNIT FOR AN INDUCTIVE CHARGING SYSTEM AND METHOD FOR OPERATING A PRIMARY UNIT

(71) Applicant: Bayerische Motoren Werke Aktiengesellschaft, Munich (DE)

(72) Inventors: Marius Hassler, Eching (DE); Josef Krammer, Holzkirchen (DE); Florian Niedermeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/650,241

(22) PCT Filed: Sep. 27, 2018

(86) PCT No.: PCT/EP2018/076265
§ 371 (c)(1),
(2) Date: Mar. 24, 2020

(87) PCT Pub. No.: WO2019/072576
PCT Pub. Date: Apr. 18, 2019

(65) Prior Publication Data
US 2021/0203186 A1 Jul. 1, 2021

(30) Foreign Application Priority Data

Oct. 11, 2017 (DE) ...................... 10 2017 218 066.8

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *H02J 7/00712* (2020.01);
(Continued)

(58) Field of Classification Search
CPC ...... H02J 50/12; H02J 7/00712; H02J 50/005; H02J 2310/48; H02J 50/90; H02J 7/02;
(Continued)

(56) References Cited

U.S. PATENT DOCUMENTS

2011/0260530 A1* 10/2011 Steffka .................... B60L 50/50
307/10.1
2015/0207330 A1 7/2015 Petersen
(Continued)

FOREIGN PATENT DOCUMENTS

WO WO 2013/170173 A2 11/2013

OTHER PUBLICATIONS

International Search Report (PCT/ISA/210) issued in PCT Application No. PCT/EP2018/076265 dated Jan. 8, 2019 with English translation (five (5) pages).
(Continued)

*Primary Examiner* — John W Poos
*Assistant Examiner* — Alex W Lam
(74) *Attorney, Agent, or Firm* — Crowell & Moring LLP

(57) ABSTRACT

A primary unit for an inductive charging system includes a primary coil, which is configured to generate a magnetic field in response to a coil current through the primary coil; a first inverter, which is coupled to the primary coil via a first capacitor and which is configured to charge and/or discharge the first capacitor based on a first input voltage; and a second inverter, which is coupled to the primary coil via a second capacitor and which is configured to charge and/or discharge the second capacitor based on a second input voltage. The primary unit has a control unit, which is configured to identify capacitance information with respect to an effective capacitance of a primary resonant circuit of the primary unit, and to actuate the first inverter and the second inverter
(Continued)

depending on the capacitance information in order to effect the coil current through the primary coil.

10 Claims, 9 Drawing Sheets

(51) Int. Cl.
  *H02J 50/00* (2016.01)
  *H02J 7/00* (2006.01)
  *H02M 7/48* (2007.01)
(52) U.S. Cl.
  CPC ............ *H02J 50/005* (2020.01); *H02M 7/48* (2013.01); *H02J 2310/48* (2020.01); *H02M 7/4818* (2021.05)
(58) Field of Classification Search
  CPC .. H02J 50/60; H02J 7/025; H02J 50/70; H02J 50/80; H02J 50/10; B60L 53/122; B60L 53/12; B60L 53/38; H02M 7/48; H02M 2007/4818; H02M 2007/4815; H04B 5/0037; H01F 38/14; Y02T 90/14; Y02T 10/7072; Y02T 10/70
  See application file for complete search history.

(56) References Cited

U.S. PATENT DOCUMENTS

| | | | |
|---|---|---|---|
| 2015/0289321 A1* | 10/2015 | Uchida | H02M 5/4585 219/662 |
| 2016/0190815 A1* | 6/2016 | Keeling | B60L 5/005 307/104 |
| 2017/0018973 A1* | 1/2017 | Murayama | B60L 53/126 |
| 2019/0089171 A1* | 3/2019 | Fischer | H02J 7/025 |

OTHER PUBLICATIONS

German-language Written Opinion (PCT/ISA/237) issued in PCT Application No. PCT/EP2018/076265 dated Jan. 8, 2019 (eight (8) pages).

German-language Search Report issued in German Application No. 10 2017 218 066.8 dated Dec. 5, 2019 with partial English translation (13 pages).

Deng et al., "An Inductive Power Transfer System Supplied by a Multiphase Parallel Inverter," IEEE Transactions on Industrial Electronics, Sep. 2017, pp. 7039-7048, vol. 64, No. 9, XP055533155 (10 pages).

\* cited by examiner

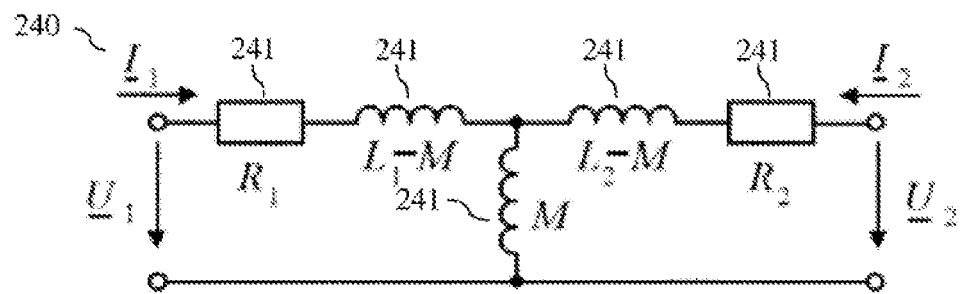
Fig. 2b
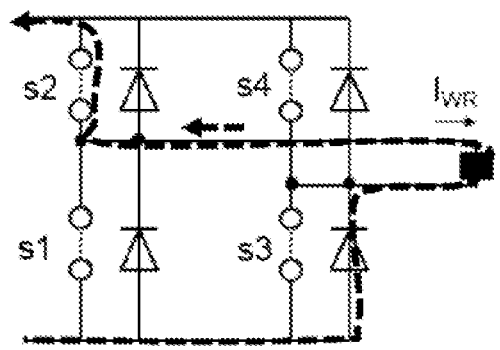
Fig. 2c1
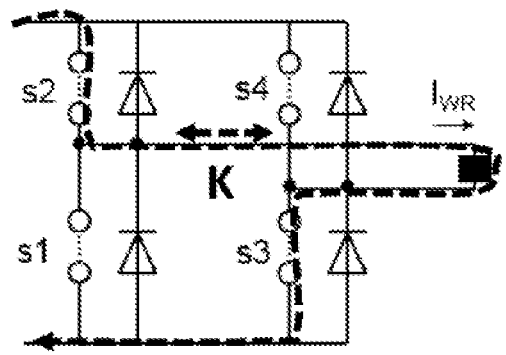
Fig. 2c2

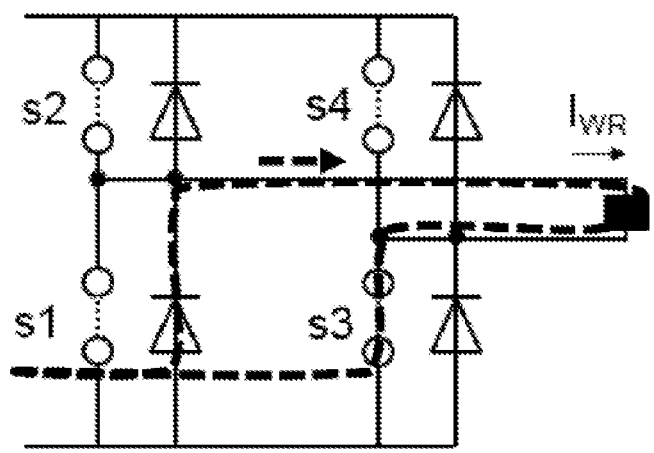
Fig. 2c3
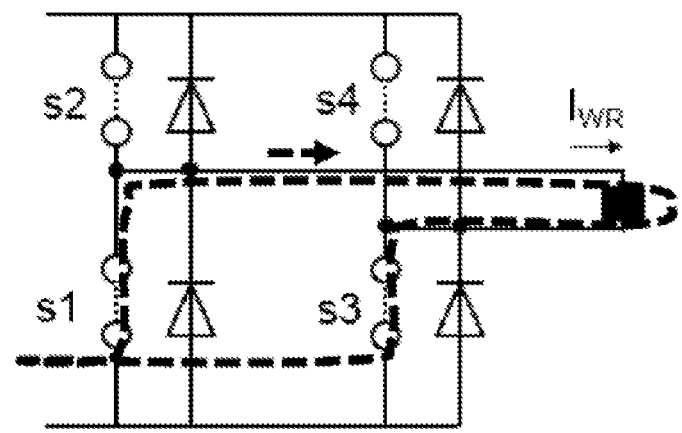
Fig. 2c4
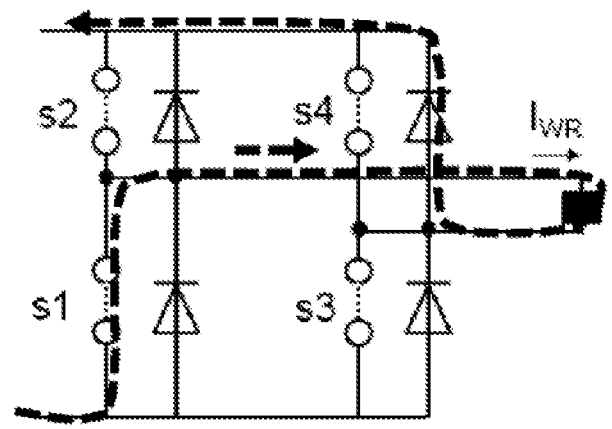
Fig. 2c5

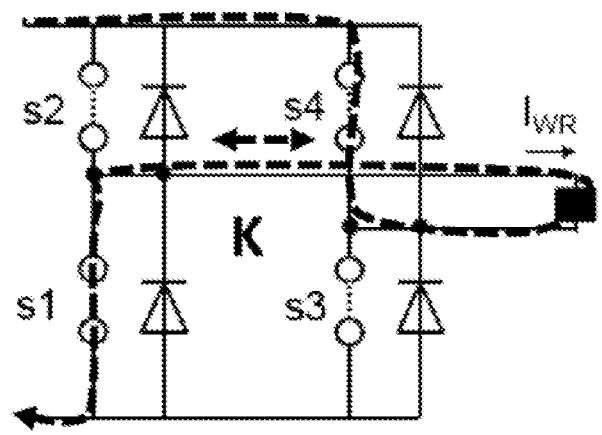
Fig. 2c6
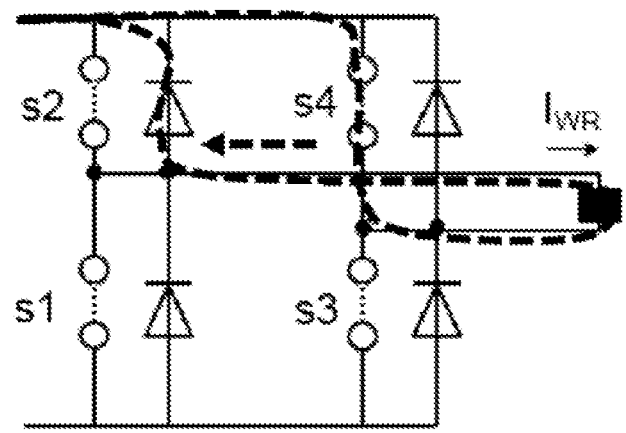
Fig. 2c7
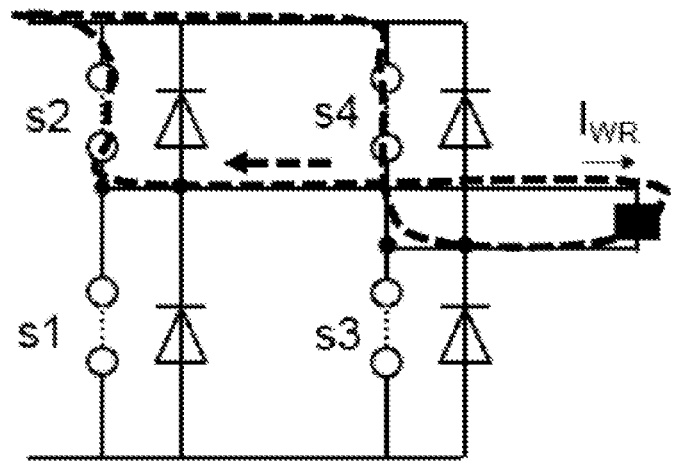
Fig. 2c8

PRIMARY UNIT FOR AN INDUCTIVE CHARGING SYSTEM AND METHOD FOR OPERATING A PRIMARY UNIT

BACKGROUND AND SUMMARY OF THE INVENTION

The invention relates to a primary unit for an inductive charging system. Moreover, the invention relates to a method for operating a primary unit for an inductive charging system.

Vehicles with an electric drive typically comprise a battery (i.e., an electrical energy store), in which electrical energy for operating an electric engine of the vehicle can be stored. The battery of the vehicle can be charged using electric power from a power grid. To this end, the battery is coupled to the power grid in order to transfer electric power from the power grid to the battery of the vehicle. Coupling can be wired (via a charging cable) and/or wireless (on the basis of inductive coupling between a charge station and the vehicle).

An approach for automatically, wirelessly, inductively charging the battery of the vehicle consists of electric power being transferred to the battery, from the ground to the underbody of the vehicle via magnetic induction across the underbody clearance. This is illustrated in FIG. 1 in exemplary fashion. In particular, FIG. 1 shows a vehicle 100 comprising an energy storage device 103 for electric power (e.g., comprising a rechargeable battery 103). The vehicle 100 comprises a secondary coil 121 in the vehicle underbody, the secondary coil 121 being connected to the storage 103 for electrical energy via a rectifier. The rectifier is part of secondary electronics 123. The secondary coil 121 and the secondary electronics 123 are typically electrically conductively coupled to one another via at least one (AC) line 122 and together form a so-called "Wireless Power Transfer" (WPT) vehicle unit 120 or secondary unit 120.

The secondary coil 121 of the secondary unit 120 can be positioned over a primary coil 111, the primary coil 111 being attached to, e.g., the floor of a garage. Typically, the primary coil 111 is part of a so-called WPT ground unit 110 or primary unit 110. The primary coil 111 is connected via an (AC) line 112 to primary electronics 113 and, further, to a power supply. The primary electronics 113 may comprise a radiofrequency generator or inverter, which produces an AC (alternating current) current in the primary coil 111 of the WPT ground unit 110, as a result of which a magnetic field (more particularly a magnetic charging field) is induced. The magnetic charging field may be at a frequency from a predefined charging field frequency range. The charging field frequency of the electromagnetic charging field may lie in the range of 80-90 kHz (more particularly, at 85 kHz).

In the case of sufficient magnetic coupling between the primary coil 111 of the primary unit 110 and the secondary coil 121 of the secondary unit 120 (i.e., the case of a sufficiently high degree of coupling) across the underbody clearance 130, a corresponding voltage, and hence also a current, is induced in the secondary coil 121 by the magnetic field. The induced current in the secondary coil 121 of the secondary unit 120 is rectified by the rectifier of the secondary electronics 123 and stored in the energy storage device 103. This allows electric power to be transferred wirelessly from a power supply to the energy storage device 103 of the vehicle 100. The charging process can be controlled in the vehicle 100 by a charging controller of the secondary electronics 123. To this end, the charging controller can be configured to communicate with the primary unit 110, for example in wireless fashion (for instance via WLAN).

Typically, use is made of resonant inductive coupling systems for bridging a relatively large underbody clearance 130. To this end, the primary unit 110 comprises a primary resonant circuit, which comprises a primary coil 111. Moreover, the secondary unit 120 comprises a secondary resonant circuit, which comprises the secondary coil 121. The resonant frequency of the resonant circuits typically depends on the transmission parameters of the inductive coupling system, which in turn depend on the offset situation between the primary coil 111 and the secondary coil 121. Moreover, the voltage of the energy storage device 103 to be charged may have an influence on the transmission parameters.

Consequently, the resonant frequencies of the resonant circuits of the primary unit 111 and of the secondary unit 121 may substantially deviate from one another during a charging process, depending on the specific charging situation, as a result of which the efficiency of a charging process can be impaired.

The present document considers the technical problem of providing a primary unit with a primary resonant circuit, which can be adapted to different charging situations in an efficient and precise fashion.

The problem is solved by the independent claims. Advantageous embodiments are described, inter alia, in the dependent claims. Reference is made to the fact that additional features of a patent claim dependent on an independent patent claim, without the features of the independent patent claim or only in combination with a subset of the features of the independent patent claim, can form a dedicated invention which is independent of the combination of all the features of the independent patent claim and which can be made the subject matter of an independent claim, of a divisional application or of a subsequent application. This applies in the same way to technical teachings which are described in the description and which can form an invention that is independent of the features of the independent patent claims.

A primary unit for an inductive charging system is described according to one aspect. The charging system is configured to transfer energy from the primary unit to a secondary unit via a magnetic field. Here, the charging system can preferably be embodied to charge the energy storage device of a motor vehicle, in particular a road motor vehicle.

The primary unit comprises a primary coil configured to generate the magnetic field in response to a coil current through the primary coil. Here, the magnetic field (also referred to as charging field in this document) and the coil current typically have a specific charging field frequency. The primary coil is part of a primary resonant circuit for providing a magnetic field with a relatively large transmission power. The resonant frequency of the primary resonant circuit depends on the effective inductance of the primary coil. The latter typically depends on the offset between the primary coil and the secondary coil of the secondary unit. Furthermore, the charging voltage of the energy storage device to be charged may also have an influence on the effective inductance of the primary coil. Consequently, the effective inductance, and hence the resonant frequency, can vary over a certain range. The primary unit described in this document can be embodied to at least partly compensate for the variation in the effective inductance. In particular, the effective capacitance of the primary resonant circuit can be adapted to this end.

The primary unit comprises a first inverter (which comprises a first full bridge, for example), coupled to the primary coil via a first capacitor and configured to charge or discharge the first capacitor on the basis of a first input voltage. The first capacitor can have a first capacitance $C_{1A}$. Typically, the first capacitor is arranged in series with the primary coil.

Moreover, the primary unit comprises a second inverter (which comprises a second full bridge, for example), coupled to the primary coil via a second capacitor and configured to charge or discharge the second capacitor on the basis of a second input voltage. The second capacitor can have a second capacitance $C_{1B}$. Typically, the second capacitor is arranged in series with the primary coil.

Consequently, it is possible to provide a (series) primary resonant circuit, which comprises the primary coil and at least part of the first and/or the second capacitor, depending on the operation of the first and/or the second inverter. Consequently, the effective capacitance of the primary resonant circuit can be adapted by adapting the operation of the first and/or the second inverter. In particular, operating the first and/or the second inverter can modify the share of the first capacitance of the first capacitor and/or the share of the second capacitance of the second capacitor in the effective capacitance.

Reference is made to the fact that the partial integration of capacitors by the operation of inverters, described in this document, may also be transferred to further circuit structures. Thus, for example, LC combinations, e.g., for EMC filtering, can still be inserted between the first capacitor and the second capacitor, and the first inverter.

Further, the primary unit comprises a control unit configured to ascertain a capacitance information item in respect of an effective capacitance of the primary resonant circuit of the primary unit. Expressed differently, the capacitance information item can indicate the effective capacitance that the primary resonant circuit should have. By way of example, the capacitance information item can indicate a capacitance value of between $C_{1B}$ and $(C_{1A}+C_{1B})$, particularly if the output of the first inverter is directly coupled to the primary coil via the first capacitor and if the output of the second inverter is directly coupled to the primary coil via the second capacitor. By way of example, the first inverter can be operated in such a way that the first capacitor is arranged, at least intermittently, in parallel with the second capacitor, and hence an effective capacitance of between $C_{1B}$ and $(C_{1A}+C_{1B})$ arises.

Secondly, the first capacitor can be coupled to the primary coil via the second capacitor. Moreover, the output of the first inverter can be coupled to an output of the second inverter via the first capacitor. This allows the voltage level of the output of the second inverter to be reduced, and so reverse currents from the output of the second inverter to the input of the second inverter can be reduced or entirely avoided. In such a case, in particular, the capacitance information item can indicate a capacitance value of between $(C_{1A}*C_{1B})/(C_{1A}+C_{1B})$ and $C_{1B}$. By way of example, the first inverter can be operated in such a way that the first capacitor is arranged, at least intermittently, in series with the second capacitor, and hence an effective capacitance of between $(C_{1A}*C_{1B})/(C_{1A}+C_{1B})$ and $C_{1B}$ arises.

Different effective capacitances of the primary resonant circuit can consequently be set in quasi-continuous fashion by way of the provision of two separate inverters. To this end, the control unit can be configured to drive the first inverter and the second inverter on the basis of the capacitance information item in order to bring about the coil current through the primary coil. Here, the control unit can be configured to drive the first inverter and the second inverter on the basis of the capacitance information item so that the coil current is partly or intermittently generated by the first inverter only and/or partly or intermittently generated by the second inverter only. The effective capacitance of the primary resonant circuit can then be efficiently and precisely set by way of the share of the first inverter and/or of the second inverter in the coil current. Consequently, the primary unit can be adapted to different charging situations in efficient and precise fashion.

As already presented above, the magnetic field and the coil current should typically be at a certain frequency (e.g., at approximately 85 kHz). The control unit can be configured to drive the first inverter and the second inverter cyclically in a sequence of different phases (or states) such that the sequence of different phases is repeated at the specific frequency. Here, the duration of one or more phases of the sequence of phases can be adapted on the basis of the capacitance information item in order to adapt the primary unit to a specific charging situation. Here, the capacitance information item typically depends on the respective charging situation. In particular, the capacitance information item typically depends on the offset between the primary coil and the secondary coil and/or on the charging voltage of the energy storage device to be charged.

The control unit can be configured to prompt the second inverter during a first charging phase to bring about a coil current in the positive direction through the second capacitor and through the primary coil. Here, the coil current preferably does not flow through the first capacitor during the first charging phase. Moreover, the control unit can be configured to prompt the first inverter during a second charging phase to bring about a coil current in the positive direction through the first capacitor and through the primary coil. Here, depending on the arrangement of the first and second capacitor, the coil current cannot flow or possibly can also flow through the second capacitor during the second charging phase. The duration of the first and/or the second charging phase can be adapted on the basis of the capacitance information item in order to change the influence of the first capacitance $C_{1A}$ and/or the second capacitance $C_{1B}$ on the effective capacitance or in order to change the effective capacitance of the primary resonant circuit.

Moreover, the control unit can be configured to prompt the second inverter during a first discharging phase to bring about a coil current in the negative direction through the second capacitor and through the primary coil. Here, the coil current preferably does not flow through the first capacitor during the first discharging phase. Moreover, the control unit can be configured to prompt the first inverter during a second discharging phase to bring about a coil current in the negative direction through the first capacitor and through the primary coil. Here, depending on the arrangement of the first and second capacitor, the coil current cannot flow or possibly can also flow through the second capacitor during the second discharging phase. The duration of the first and/or the second discharging phase can be adapted on the basis of the capacitance information item in order to change the influence of the first capacitance $C_{1A}$ and/or the second capacitance $C_{1B}$ on the effective capacitance or in order to change the effective capacitance of the primary resonant circuit.

Moreover, the control unit can be configured to bring about a freewheeling phase between a charging phase and a subsequent discharging phase or between a discharging phase and a subsequent charging phase, during which freewheeling phase the first and second inverters are not driven so as to reduce an amplitude of the coil current in terms of magnitude. Here, the switching elements of the inverters can be in an open state during a freewheeling phase. Secondly, the coil current can flow over one or more flyback diodes of the switching elements during a freewheeling phase. The duration of a freewheeling phase can be adapted on the basis of the capacitance information item in order to change the influence of the first capacitance $C_{1A}$ and/or the second capacitance $C_{1B}$ on the effective capacitance or in order to change the effective capacitance of the primary resonant circuit.

The first inverter and the second inverter can be operated in a sequence of different phases in such a way that the sequence of phases comprises the first charging phase, the second charging phase, a freewheeling phase, the first discharging phase, the second discharging phase and a further freewheeling phase. The order of the sequence of phases preferably corresponds to the aforementioned order of the individual phases in this case. The overall duration of a sequence of phases is stipulated by the frequency of the coil current. Secondly, the duration of the individual phases can be adapted on the basis of the capacitance information item in order to change the influence of the first capacitance $C_{1A}$ and/or the second capacitance $C_{1B}$ on the effective capacitance or in order to change the effective capacitance of the primary resonant circuit.

The first capacitor can comprise a first partial capacitor, which is coupled to a first side of the primary coil, and a second partial capacitor, which is coupled to a second side of the primary coil. This can increase the symmetry of the coil current produced.

As already explained above, the first capacitor can be coupled to the primary coil via the second capacitor. Moreover, the output of the first inverter can be coupled to the output of the second inverter via the first capacitor. The second capacitance $C_{1B}$ of the second capacitor can then be such that the voltage at the output of the second inverter does not exceed the second input voltage during the operation of the primary unit. This can reliably avoid reverse currents.

The first full bridge and the second full bridge can each comprise semiconductor-based switching elements (in particular MOS transistors and/or IGBTs (insulated-gate bipolar transistors)). Here, the switching elements can each comprise a flyback diode. The coil current can flow over one or more flyback diodes during a freewheeling phase.

The first capacitor and/or the second capacitor can each comprise a multiplicity of partial capacitors with a multiplicity of partial capacitances. The individual partial capacitors can be activated or deactivated (by the control unit) in order to modify the first capacitance of the first capacitor and/or the second capacitance of the second capacitor. Consequently, the first capacitance and/or the second capacitance can be modified for setting the effective capacitance of the primary resonant circuit. The partial capacitors can be activated/deactivated on the basis of the capacitance information item. As a consequence of this, there can be an increase in the range within which the effective capacitance can be set.

Accordingly, the primary resonant circuit may comprise one or more partial inductances, which can be activated or deactivated (by the control unit) in order to modify the effective inductance of the primary resonant circuit. The partial inductances can be activated/deactivated on the basis of the capacitance information item. This can further increase the compensation possibilities of the primary unit.

Further, the control unit can be configured to adapt the target frequency of the coil current and/or of the magnetic field. In particular, the frequency can be adapted within an admissible charging field frequency range. The frequency can be adapted on the basis of the capacitance information item. This can further increase the compensation possibilities of the primary unit.

A charging apparatus (in particular for a vehicle or a road motor vehicle, for instance an automobile, a truck, a bus or a motorbike) comprising the primary unit described in this document is described according to a further aspect.

A method for operating a primary unit of an inductive charging system is described according to a further aspect, said inductive charging system being configured to transfer energy from the primary unit to a secondary unit via a magnetic field. The primary unit comprises a primary coil, configured to generate the magnetic field in response to a coil current through the primary coil. Moreover, the primary unit comprises a first inverter, coupled to the primary coil via a first capacitor and configured to charge or discharge the first capacitor on the basis of a first input voltage. The primary unit further comprises a second inverter, coupled to the primary coil via a second capacitor and configured to charge or discharge the second capacitor on the basis of a second input voltage. Here, the first input voltage and the second input voltage can be the same.

The method includes ascertaining a capacitance information item in relation to an effective capacitance of a primary resonant circuit of the primary unit, wherein the primary resonant circuit comprises the primary coil. Here, the capacitance information item can be ascertained on the basis of the offset between the primary coil and the secondary coil of the secondary unit and/or on the basis of the charging voltage of an energy storage device to be charged. As an alternative or in addition thereto, the capacitance information item can be ascertained within the scope of a feedback loop between the primary unit and the secondary unit, by means of which the coupling factor and/or the transmission power of the inductive coupling system are improved, more particularly maximized or optimized, by way of adapting the effective capacitance of the primary resonant circuit. The capacitance information item can indicate the effective capacitance and/or the operational parameters for the first and/or second inverter, by means of which the coupling factor and/or the transmission power are improved, more particularly optimized.

Moreover, the method includes driving the first inverter and the second inverter on the basis of the capacitance information item in order to bring about the coil current through the primary coil.

A software (SW) program is described according to a further aspect. The SW program can be configured to be executed on a processor in order thereby to carry out the method described in this document.

A storage medium is described according to a further aspect. The storage medium may comprise a SW program, which is configured to be executed on a processor in order thereby to carry out the method described in this document.

It should be noted that the methods, apparatuses and systems described in this document can be used both on their own and in combination with other methods, apparatuses and systems described in this document. Moreover, all aspects of the methods, apparatuses and systems described in this document can be combined with one another in multifaceted ways. In particular, the features of the claims can be combined with one another in multifaceted ways.

The invention will be described in more detail below on the basis of exemplary embodiments.

BRIEF DESCRIPTION OF THE DRAWINGS

FIG. 2b shows an exemplary model for an inductive charging system;

FIGS. 2c1 to 2c8 show exemplary phases or states of an inverter;

DETAILED DESCRIPTION OF THE DRAWINGS

Figure 2A:
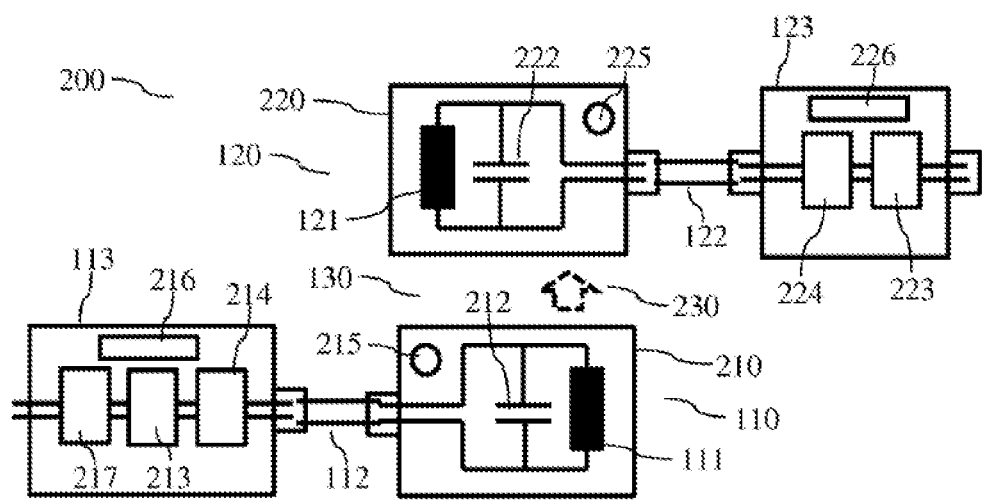
FIG. 2a shows an exemplary resonant inductive charging system.

As presented at the outset, the present document considers the provision of a flexibly adjustable primary unit 110 for an inductive charging system. In this context, FIG. 2a shows a schematic of an exemplary inductive charging system 200 with a WPT ground unit 110 (as an example of a primary unit) and a WPT vehicle unit 120 (as an example of a secondary unit). As part of the primary electronics 113, the primary unit 110 comprises a power factor correction filter 217 and an inverter 213, the inverter 213 being configured to generate an AC current at a charging field frequency from a DC current (e.g., at a DC voltage of approximately 400 V, 500 V or more). Moreover, the primary unit 110 comprises the primary coil 111 and a primary capacitor 212. Moreover, a filter 214 of the primary electronics 113 is illustrated in exemplary fashion in FIG. 2a. Consequently, the primary unit 110 comprises a parallel and/or a series resonant circuit 210 (also referred to as primary resonant circuit here), the resonant frequency of which approximately emerges as $$f_0 = \frac{1}{2\pi\sqrt{LC}}$$

from the overall capacitance or the effective capacitance C (in particular the capacitance of the primary capacitor 212) and the overall inductance or the effective inductance L (in particular the inductance of the primary coil 111). The charging field frequency of the AC current and of the magnetic field 230 generated by the primary coil 111 is preferably close to the resonant frequency $f_0$, in order to generate a primary current (also referred to in this document as coil current) which is as high as possible through the primary coil 111 (through a resonance). A high primary current is typically required since the coupling factor k between the primary coil 111 and the secondary coil 121 is relatively small, e.g., k~0.1, on account of the relatively large air gap 130. The primary resonant circuit 210 may further comprise one or more sensors 215 (e.g., a temperature sensor) for monitoring the primary resonant circuit 210. Moreover, the primary electronics 113 may comprise a control unit 216 for adapting the charging field frequency and/or for controlling the inverter 213.

Analogously, the secondary unit 120 comprises a (parallel and/or series) resonant circuit 220 (also referred to as secondary resonant circuit here), which is formed by the secondary coil 121 and a secondary capacitor 222. The resonant frequency of this secondary resonant circuit 220 is preferably adapted to the resonant frequency of the primary resonant circuit 210 of the primary unit 110 in order to achieve the best possible energy transmission. The secondary resonant circuit 220 may further comprise one or more sensors 225 (e.g., a temperature sensor) for monitoring the secondary resonant circuit 220. Moreover, a compensation network (e.g., with a filter capacitor) 224, a rectifier 223 and a control unit 226 of the secondary electronics 123 are illustrated in FIG. 2a.

The inductive coupling system 200 between the primary coil 111 and the secondary coil 121 can be described or modeled by a T equivalent circuit diagram (see FIG. 2b), for example. As transmission parameters 241, this model 240 has the effective inductance $L_1$ of the primary coil 111, the effective inductance $L_2$ of the secondary coil 121 and the coupling factor k (with the mutual inductance $$M = k \cdot \sqrt[2]{L_1 L_2}\ ).$$

Here, the transmission parameters $L_1$, $L_2$, M, k 241 are typically functions of the relative position between primary coil 111 and secondary coil 121, i.e., functions of x, y, z. Moreover, the resultant input impedance or input inductance ($Z_E = U_1/I_1$) may depend on the output impedance and hence on the voltage at the energy storage device 103 to be charged.

The effective inductance $L_1$ of the primary coil 111 can consequently be different for different boundary conditions of a charging process, and so the resonant frequency of the primary resonant circuit may vary. This applies analogously to the secondary resonant circuit.

In order to at least partly compensate the effects on the primary and/or the secondary resonant circuit, frequency tuning, i.e., an adaptation of the charging field frequency, can be carried out. Since, overall, the possible variations in the boundary conditions for a charging process can be relatively large, frequency tuning would however have to be facilitated over a relatively large frequency range. However, the possible frequency range for the charging field frequency is typically restricted in this case (in particular, to the frequency range of 81.38 to 90 kHz, by the FCC (Federal Communications Commission) Frequency Table).

As an alternative or in addition thereto, fixed compensation circuits can be used within the primary unit 110. However, the design of the driving circuit, the chokes and the capacitors would have to be over-dimensioned multiple times in order to be able to make the required power available at each operating point. Such over-dimensioning is typically connected to relatively high losses.

As an alternative or in addition thereto, use can be made of modifiable or adjustable elements (e.g., capacitors and/or inductances) for adapting the resonant frequency of the primary and/or secondary resonant circuit. However, this requires the use of additional switching elements (in particular transistors) on the performance path, which typically causes additional losses. Moreover, driving the switching elements may involve a relatively high outlay.

Figure 3A:
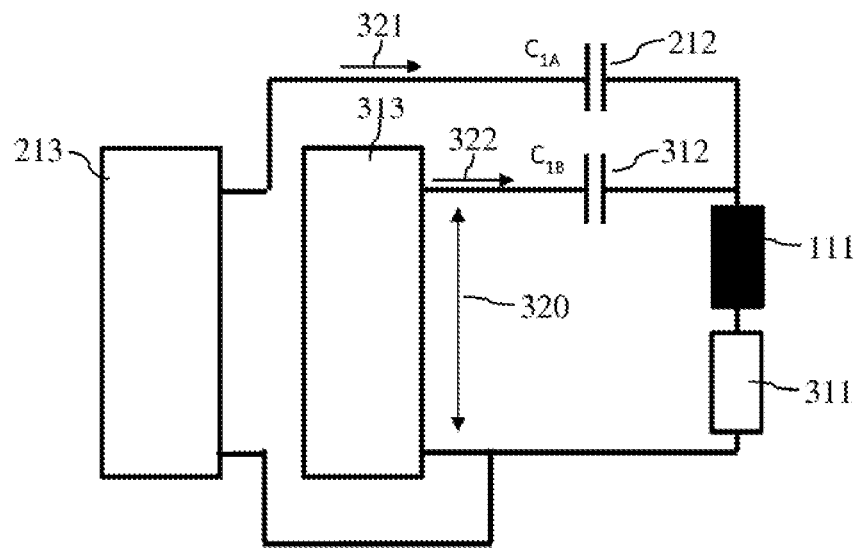
FIGS. 3a to 3c show exemplary inverters for a primary unit of an inductive charging system.
Figure 3B:
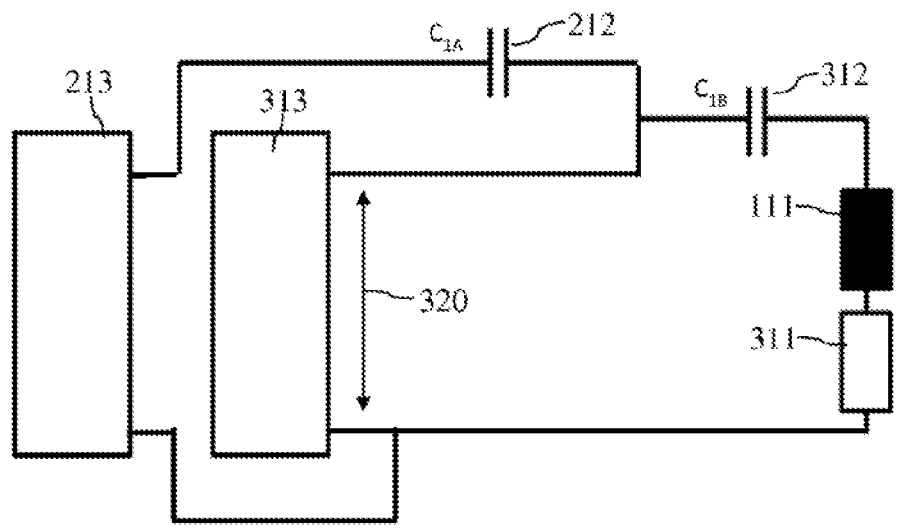
Figure 3C:
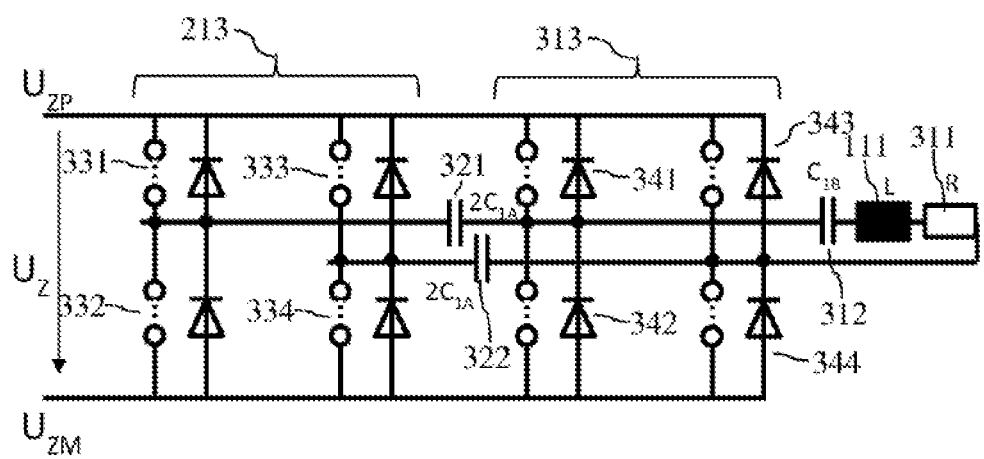
Figure 4A:
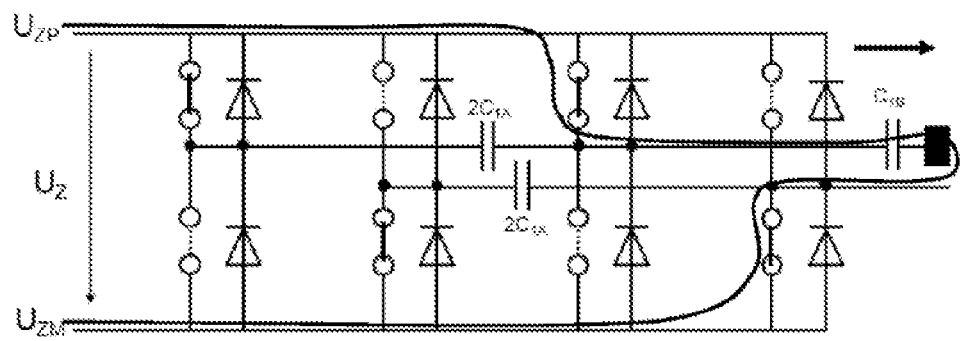
FIGS. 4a to 4g show exemplary phases or states of a primary resonant circuit of a primary unit.
Figure 4B:
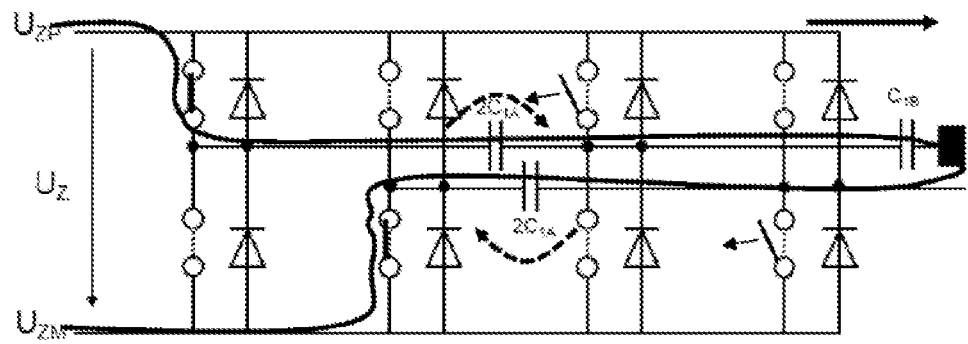
Figure 4C:
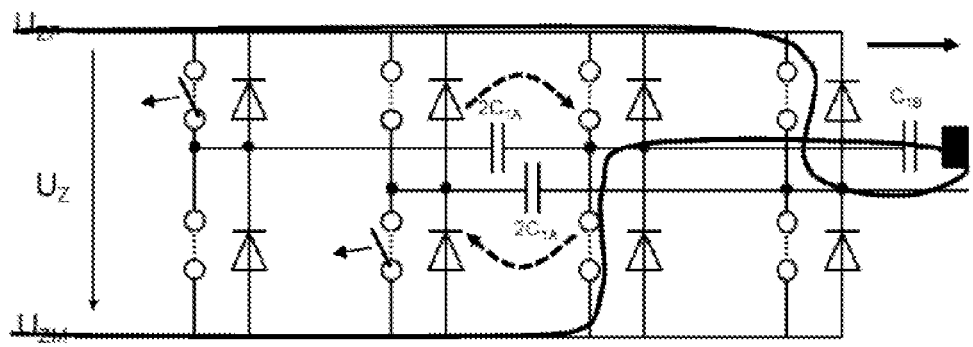
Figure 4D:
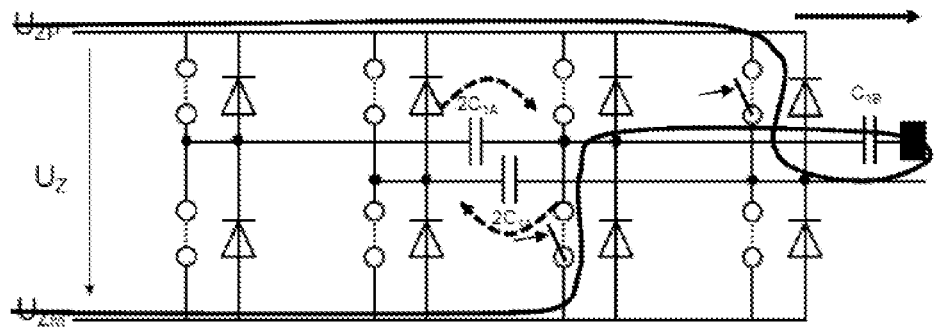
Figure 4E:
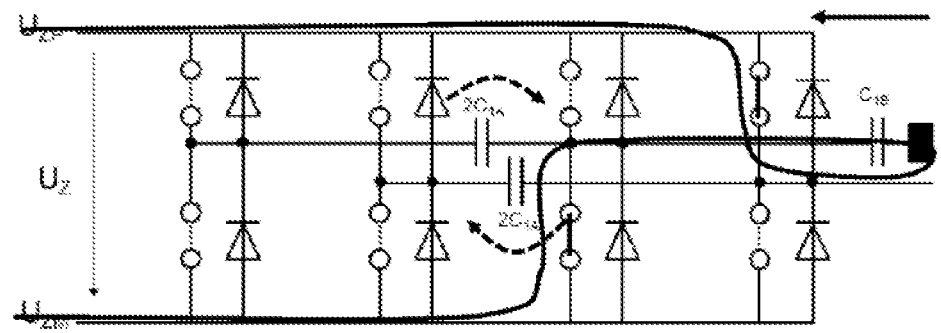
Figure 4F:
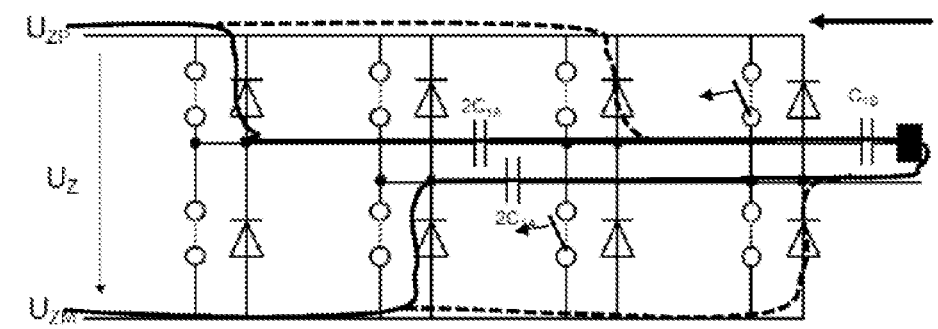
Figure 4G:
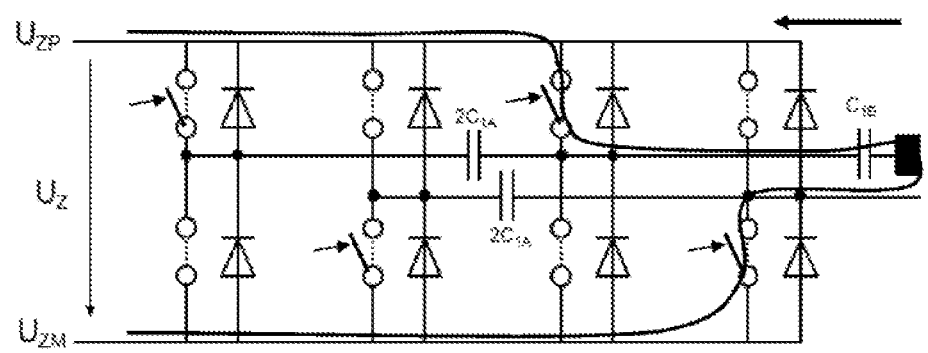

FIGS. 3a to 3c show a primary unit 110 comprising a plurality of inverters 213, 313, wherein an (AC) current can be provided by way of each inverter 213, 313, which current can be guided to the primary coil 111 via at least one capacitor 212, 312 in each case (with the loss resistance 311 of the primary coil 111 additionally being depicted in FIG. 3a). In particular, as illustrated in FIG. 3a, a first current 321 can be generated by way of a first inverter 213 and can be guided to the primary coil 111 via a first capacitor 212 (with the first capacitance $C_{1A}$). Moreover, a second current 322 can be generated by way of a second inverter 313 and can be guided via a second capacitor 312 (with the second capacitance $C_{1B}$) to the primary coil 111.

Consequently, a series primary resonant circuit is provided, the resonant frequency of which depends on the effective inductance $L_1$ of the primary coil 111 and on the effective capacitance $C_1$ of the first and the second capacitor 212, 312. Here, the effective capacitance $C_1$ depends on the ratio between the first current 321 and the second current 322. By way of example, the effective capacitance $C_1$ corresponds to the capacitance $C_{1A}$ of the first capacitor 212 if the second current 322 is zero (i.e., if the second inverter 313 is inactive). Secondly, the effective capacitance $C_1$ corresponds to the sum of the first capacitance $C_{1A}$ of the first capacitor 212 and the second capacitance $C_{1B}$ of the second capacitor 312 (i.e., $C_1=C_{1A}+C_{1B}$) if the first current 321 and the second current 322 are equal, i.e., if both the first and the second inverter 213, 313 are active. Consequently, the effective capacitance $C_1$ can be set over a relatively large value range by a graduated operation of the first and/or second inverter 213, 313. By way of example, the effective capacitance $C_1$ can be set, possibly continuously, between $C_{1A}$ and $C_{1A}+C_{1B}$ by way of a graduated operation of the second inverter 313.

In the arrangement illustrated in FIG. 3, at least one inverter 213, 313 is preferably reverse current-free. This can be obtained by virtue of, e.g., connecting one inverter 213, 313, as illustrated in FIG. 2c, to a dedicated, higher feed voltage (or via a diode to a common feed). By way of example, the input voltage of the second inverter 313 can be higher than the input voltage of the first inverter 213. An alternative or complementary solution for avoiding reverse currents is presented below.

FIG. 3c shows exemplary inverters 213, 313. An inverter 213, 313 typically comprises a full bridge with two half bridges, wherein the center of a first half bridge is coupled to one side of the primary coil 111 and the center of the second half bridge is coupled to the other side of said primary coil. The first half bridge of the first inverter 213 comprises the switching elements 331 and 332. The second half bridge of the first inverter 213 comprises the switching elements 333 and 334. The first half bridge of the second inverter 313 comprises the switching elements 341 and 342. The second half bridge of the second inverter 313 comprises the switching elements 343 and 344. By way of example, a switching element can comprise an MOS transistor and/or an IGBT. Typically, a switching element here comprises a flyback diode, which blocks in the direction of the DC voltage or input voltage $U_Z=U_{ZP}-U_{ZM}$, but which is conductive in the opposite direction.

Figure 1:
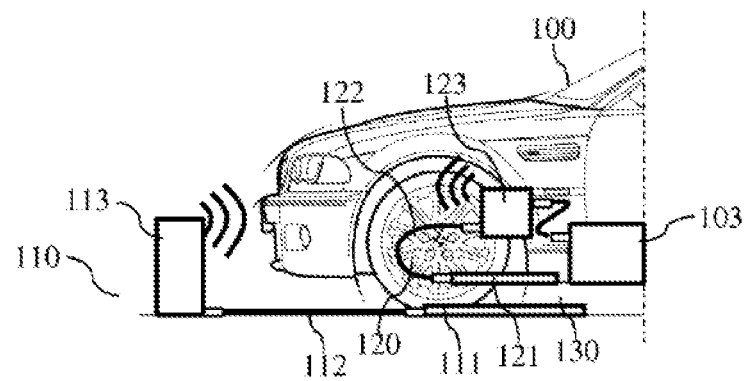
FIG. 1 shows exemplary components of an inductive charging system for charging the energy storage device of a vehicle.
Figure 2D:
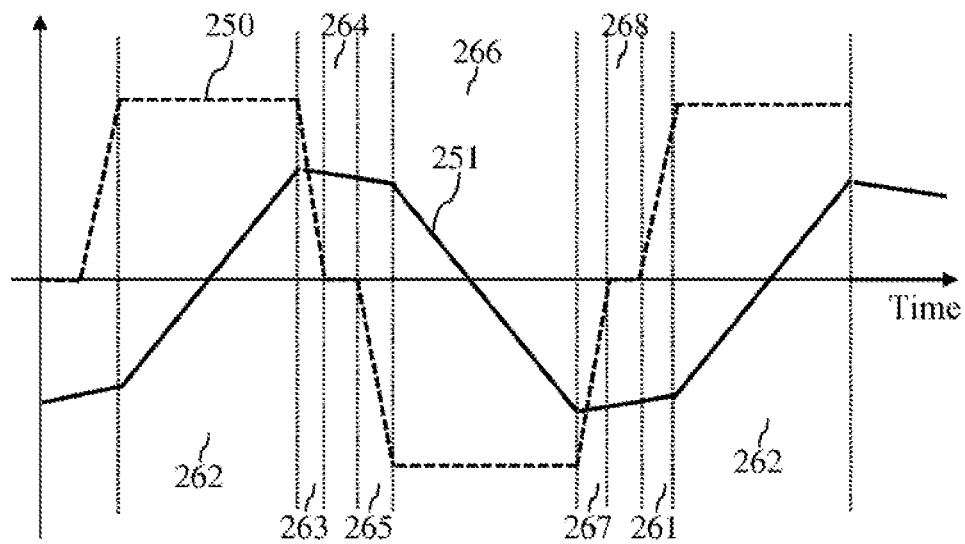
FIG. 2d shows an exemplary time curve of the output voltage and of the output current of an inverter.

The operation of an inverter 213, 313 for generating an AC voltage from the DC or input voltage $U_Z$ is described in exemplary fashion below. Here, table 1 and FIGS. 2c1 to 2c8 show different switching states or phases of the switching elements 331, 341 (s2), 332, 342 (s1), 333, 343 (s4), 333, 344 (s3) and FIG. 2d shows the curve of the output voltage 250 of the inverter 213, 313 under the assumption that the inverter 213, 313 is only loaded by an inductance. The state "-" indicates that the switching element can be "open" or "closed" as desired. The states or phases "5" to "8" correspond to states or phases "1" to "4", but with reversed or commutated current direction. The states or phases "1" to "8" are cyclically repeated at a certain frequency in order to generate an AC current $I_{WR}$ 251. The frequency of the cyclical repetition corresponds to the charging field frequency of the charging field 230 to be generated in this case. The flow direction of the AC current in the different states or phases is indicated by an arrow. The letter "K" indicates that the flow direction of the current reverses (i.e., commutates) during the respective phase or in the respective state.

TABLE 1

| Phase | s1 | s2 | s3 | s4 |
|---|---|---|---|---|
| 1 (FIG. 2c1) | Open | Closed | — | Open |
| 2 (FIG. 2c2) | Open | Closed | Closed | Closed |
| 3 (FIG. 2c3) | — | Open | Closed | Open |
| 4 (FIG. 2c4) | Closed | Open | Closed | Open |
| 5 (FIG. 2c5) | Closed | Open | Open | — |
| 6 (FIG. 2c6) | Closed | Open | Open | Closed |
| 7 (FIG. 2c7) | Open | — | Open | Closed |
| 8 (FIG. 2c8) | Open | Closed | Open | Closed |

FIG. 2d shows the time curve of the output voltage 250 and of the output current 251 of the inverter 231, 313 in phases 1 to 8 (characterized by reference signs 261 to 268).

The first inverter 213 and the second inverter 313 of FIG. 3a can each be constructed and operated as described in FIGS. 2c and 2d. This can cause a primary resonant circuit to be able to be provided with an effective capacitance of $C_1=C_{1A} C_{1B}$. Secondly, only the first inverter 213 can be operated where applicable in order to provide a primary resonant circuit with an effective capacitance of $C_1=C_{1A}$. However, there may be reverse currents via the flyback diodes of the second inverter 313 in the process if the voltage 320 at the output of the second inverter 313 is greater than the input voltage $U_Z$ at the input of the second inverter 313. The voltage 320 at the output of the second inverter 313 can be reduced and reverse currents can be avoided if the capacitors 212, 312 are arranged like in FIG. 3b. In particular, the voltage 320 can be reduced by the voltage drop across the second capacitor 312.

FIG. 3c shows the arrangement of FIG. 3b with the switching elements 331, 332, 333, 334 of the first inverter 231 and the switching elements 341, 342, 343, 344 of the second inverter 313. Moreover, the first capacitor 212 was split into partial capacitors 321, 322 with capacitances $2C_{1A}$ (i.e., each with two times the first capacitance $C_{1A}$) in FIG. 3c in order to design the arrangement to be symmetric, which has a positive effect on the generated coil current.

In order to provide a primary resonant circuit with an effective capacitance of $C_1=C_{1B}$, the second inverter 313 can be operated on its own in FIG. 3c. Moreover, a primary resonant circuit with an effective capacitance of $C_1=C_{1B}$ can also be provided by the synchronous operation of the first and the second inverter 213, 313.

The partial capacitors 321, 322 can be included by virtue of the first inverter 213 being operated intermittently and/or by virtue of there being switching back and forth between the operation of the first and the second inverter 213, 313. An exemplary mixed operation is illustrated in FIGS. 4a to 4g with the states of the switching elements 331, 332, 333, 334, 341, 342, 343, 344 in table 2. Expressed differently, FIGS. 4a to 4g show different phases of a sequence of phases. The sequence of phases can be repeated cyclically at the charging field frequency in order to generate the coil current through the primary coil 111.

TABLE 2

| Phase | 331 | 332 | 333 | 334 | 341 | 342 | 343 | 344 |
|---|---|---|---|---|---|---|---|---|
| 1 (FIG. 4a) | Closed | Open | Open | Closed | Closed | Open | Open | Closed |
| 2 (FIG. 4b) | Closed | Open | Open | Closed | Open | Open | Open | Open |
| 3 (FIG. 4c) | Open | Open | Open | Open | Open | Open | Open | Open |
| 4 (FIG. 4d) | Open | Open | Open | Open | Open | Closed | Closed | Open |
| 5 (FIG. 4e) | Open | Open | Open | Open | Open | Closed | Closed | Open |
| 6 (FIG. 4f) | Open | Open | Open | Open | Open | Open | Open | Open |
| 7 (FIG. 4g) | Closed | Open | Open | Closed | Closed | Open | Open | Closed |

In phase "1", the second capacitor 312 is charged by the second inverter 313. Phase "1" can be referred to as first charging phase. Then, in phase "2", there is a switchover to the first inverter 213, and so the first capacitor 212 or the first partial capacitors 321, 322 is/are (also) charged. Phase "2" can be referred to as second charging phase. Then, the two inverters 213, 313 can be operated in freewheeling fashion in phase "3" in order to reduce the current flow through the primary coil 111. Phase "2" can be referred to as freewheeling phase. Then, a reverse operation of the second inverter 313 is introduced in phase "4" such that the second inverter 313 drives the primary coil 111 in the negative direction in phase "5". The current flow through the primary coil 111 is reversed between phases "4" and "5". Phase "4" can be referred to as freewheeling phase. Phase "5" can be referred to as first discharging phase. There again is freewheeling of the inverters 213, 313 in phase "6", with the first capacitor 212 or the first partial capacitors 321, 322 being discharged in the process. Phase "6" can be referred to as second discharging phase. Finally, the inverters 213, 313 are prepared again for an operation in the positive direction in phase "7" by closing the switching elements 331, 334, 341, 344.

Phases "1" to "7" are repeated cyclically at the charging field frequency. Here, the first capacitors 321, 322 are charged in phase "2" and discharged again in phase "6". The degree of integration of the first capacitors 321, 322 in the primary resonant circuit can be set by the duration of phases "2" and "6". Hence, the effective capacitance of the primary resonant circuit can be adapted by way of the duration of the phases "2" and "6". Here, the first capacitors 321, 322 can each be charged only to the intermediate voltage $U_Z$ because the flyback diodes of the switching elements 331, 342 or 333, 344 would otherwise become conductive. The maximum possible effective capacitance of the primary resonant circuit can be ascertained, e.g. with taking this boundary condition into account, by means of a spice simulation.

The current through the primary coil 111 increases in the positive direction in phase "1". The current through the primary coil 111 falls in phases "2", "3" and "4" and reverses in the negative direction during the transition into phase "5". Then, the current increases in the negative direction in phase "5" and falls in phases "6" and "7". If the duration of phase "2" is increased in order to increase the integration of the first capacitors 321, 322, the duration of phase "3" can be reduced accordingly such that the overall duration of a cycle remains unchanged.

The control unit 216 of the primary unit 110 can be configured to operate the inverters 213, 313. Here, the frequency of the AC current 251 to be generated by the inverters 213, 313 (i.e., the charging field frequency) can be specified, in particular. As an alternative or in addition thereto, a target current through the primary coil 111 (e.g., a target amplitude of the current through the primary coil 111) can be specified. Then, switching times for the switching elements 331, 332, 333, 334, 341, 342, 343, 344 can be ascertained on the basis of the target frequency and/or on the basis of the target current.

Consequently, a primary unit 110 is described, the primary coil 111 of which is driven by a plurality of inverters 213, 313, which are connected to the primary coil 111 via a coupled adaptation network. The inverters 213, 313 are driven in such a way that a variance of the impedance, effective at the input of the primary coil 111, is at least partly compensated. In particular, an effective capacitance $C_1$ of the primary unit 110 can be adapted in the process.

The inverters 213, 313 can be operated in such a way that each current path is guided over a maximum of two switching elements 331, 332, 333, 334, 341, 342, 343, 344 and/or the flyback diodes thereof only. This allows semiconductor losses within the primary unit 110 to be reduced.

The capacitors 212, 312, 321, 322 incorporated by the different inverters 213, 313 can be designed in such a way that a certain variance range of the impedance can be compensated. Optionally, the capacitors 212, 312, 321, 322 can be dimensioned in such a way in the process that the overall power of the primary unit 110 is always guided via a plurality of inverters 213, 313. Thus, it is possible to use inverters 231, 313 and, in particular, switching elements with reduced power requirements. Here, the effective capacitance can be adapted in quasi-continuous fashion.

The switching elements (in particular the transistors) of the inverters 213, 313 can be implemented on the basis of a basic clock rate by setting delay times (phase shift) for the individual switching times. To this end, a control loop can be used such that precise setting of the effective capacitance is facilitated even without accurate time measurements and switching processes.

By way of the combination with frequency tuning, the required setting range of the inverters 213, 313 can be reduced. Adapting the charging field frequency allows the variation in the effective inductance to be at least partly compensated. As a consequence thereof, the required range of the variation of the effective capacitance can be reduced. In turn, this leads to the DC-link voltage $U_Z$ being able to be reduced and consequently allows the use of switching elements with reduced dielectric strength. As an alternative or in addition thereto, use can be made of switchable capacitors for adapting the capacitance and/or switchable inductances for adapting the inductance in order to compensate the variances in the impedance of the primary coil 111.

The different inverters 213, 313 can have at least partly different feed or intermediate voltages $U_Z$ at the respective input. This allows the respectively tolerable recovery voltage 320 of the individual inverters 213, 313 to be adapted.

In addition to the variation in the primary inductance 111, further variations (e.g., in relation to the power control, the battery voltage, . . . ) can also be compensated by driving the inverters 213, 313 (pulse width modulation of the different switching states, voltage $U_Z$, frequency, etc.).

The primary unit 110 may have further switching elements in order to provide the potentials $U_{ZP}$ and $U_{ZM}$ for the one or more intermediate voltages $U_Z$. Here, a first input voltage for the first inverter 213 and a second input voltage for the second inverter 313 can be provided. The input voltages for the different inverters 213, 313 can therefore be different. Thus, the setting range of the effective capacitance of the primary resonant circuit can be increased further.

Figure 5:
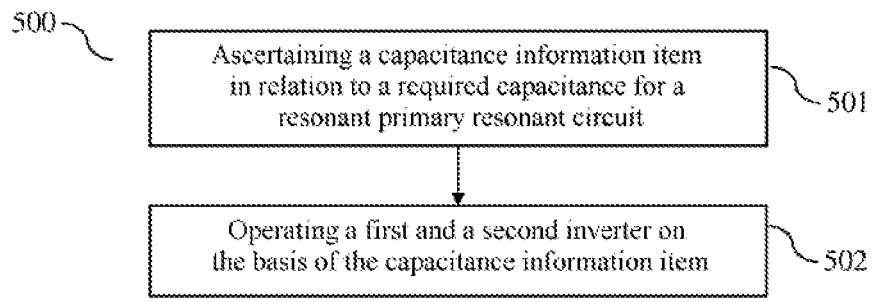
FIG. 5 shows a flowchart of an exemplary method for setting the primary resonant circuit of a primary unit.

FIG. 5 shows a flowchart of an exemplary method 500 for operating a primary unit 110 of an inductive charging system 200, which is configured to transfer energy from the primary unit 110 to a secondary unit 120 via a magnetic field 230 (also referred to as charging field in this document). The primary unit 110 comprises a primary coil 111 (e.g., a circular coil), configured to generate the magnetic field 230 in response to a coil current 251 through the primary coil 111. Here, the coil current 251 and the magnetic field 230 typically have a specific frequency (i.e., a charging field frequency).

The primary unit 110 further comprises a first inverter 213, coupled to the primary coil 111 via a first capacitor 212, 321, 322 and configured to charge or discharge the first capacitor 212, 321, 322 on the basis of a first input voltage. Here, the first capacitor 212, 321, 322 is typically connected in series with the primary coil 111 and can form a resonant circuit with the primary coil 111.

Moreover, the primary unit 110 comprises a second inverter 313, coupled to the primary coil 111 via a second capacitor 312 and configured to charge or discharge the second capacitor 312 on the basis of a second input voltage. Here, the second capacitor 312 is typically connected in series with the primary coil 111 and can form a resonant circuit with the primary coil 111. In particular, the primary unit 110 can be embodied to form a primary resonant circuit at a certain resonant frequency on the basis of the first capacitor 212, 321, 322, the second capacitor 312 and the primary coil 111. Here, the resonant frequency depends on the effective inductance $L_1$ of the primary coil 111. Moreover, the resonant frequency depends on the effective capacitance $C_1$, which is composed of the first capacitance $C_{1A}$ of the first capacitor 212, 321, 322 and the second capacitance $C_{1B}$ of the second capacitor 312 from the operation of the first inverter 213 and the second inverter 313.

The method 500 includes ascertaining 501 a capacitance information item in relation to an effective capacitance of the primary resonant circuit of the primary unit 110. In particular, it is possible to ascertain the value of the effective inductance $L_1$. On the basis thereof, it is possible to ascertain a target value for the effective capacitance (e.g., in order to set a certain resonant frequency).

Moreover, the method 500 includes driving 502 the first inverter 213 and the second inverter 313 on the basis of the capacitance information item in order to bring about the coil current 251 through the primary coil 111. In particular, the inverters 213, 313 can be driven in such a way that the target value for the effective capacitance, indicated by the capacitance information item, arises from the capacitance $C_{1A}$ of the first capacitor 212, 321, 322 and the capacitance $C_{1B}$ of the second capacitor 312.

As a result of the measures described in this document, it is possible to avoid or at least reduce further compensation measures (in particular compensation networks). Here, there can be efficient compensation of changes in the effective inductance of the primary coil 111 by way of the described measures. Moreover, further parameter variations (e.g., load phase angle, variation of the resonant capacitor (i.e., of the first or the second capacitor) itself, etc.) can be compensated. Moreover, the loss power can be reduced since the current only flows through a maximum of two switching elements. The driving times for the switching elements can be determined efficiently as driving is implemented in frequency-synchronous fashion and can be controlled by a phase shift only. Here, in the case of an appropriate design, the commutation of the current can be implemented automatically (by way of the flyback diodes). Consequently, there are relatively low requirements in respect of the timing of the switching times of the switching elements.

The loss power is divided among a plurality of inverters 213, 313, and so the heat management of a primary unit 110 is simplified. Moreover, the semiconductor-based switching elements have reduced losses on account of a reduced temperature. Moreover, the driver power for operating the inverters 213, 313 can be reduced. Moreover, the lines 112, 122 within the primary unit 110 can be flexibly adapted to different requirements since there can be a compensation of the inductance of the lines 112, 122 by way of the measures described.

The present invention is not restricted to the shown exemplary embodiments. In particular, it should be noted that the description and the figures are only intended to elucidate the principle of the proposed methods, apparatuses and systems.

What is claimed is:

1. A primary unit for an inductive charging system configured to transfer energy from the primary unit to a secondary unit via a magnetic field, comprising:
    a primary coil configured to generate the magnetic field in response to a coil current through the primary coil;
    a first inverter coupled to the primary coil via a first capacitor and configured to charge or discharge the first capacitor based on a first input voltage;
    a second inverter coupled to the primary coil via a second capacitor and configured to charge or discharge the second capacitor based on a second input voltage; and
    a control unit configured to:
        ascertain a capacitance information item with respect to an effective capacitance of a primary resonant circuit of the primary unit, wherein the primary resonant circuit comprises the primary coil;
        drive the first inverter and the second inverter based on the capacitance information item in order to bring about the coil current through the primary coil and to set the effective capacitance of the primary resonant circuit of the primary unit,
        prompt the second inverter during a first charging phase to bring about a coil current in a positive direction through the second capacitor and through the primary coil;
        prompt the first inverter during a second charging phase to bring about a coil current in the positive direction through the first capacitor and through the primary coil; and
        adapt a duration of the first and/or the second charging phase based on the capacitance information item.

2. The primary unit according to claim 1, wherein
    the first capacitor has a first capacitance C1A;
    the second capacitor has a second capacitance C1B; and
    the capacitance information item indicates a capacitance value of between (C1A*C1B)/(C1A+C1B) and C1B; or the capacitance information item indicates a capacitance value of between C1B and (C1A+C1B).

3. The primary unit according to claim 1, wherein
the control unit is further configured to:
drive the first inverter and the second inverter based on the capacitance information item so that the coil current is intermittently generated by the first inverter only and intermittently generated by the second inverter only.

4. The primary unit according to claim 1, wherein the control unit is further configured to:
prompt the second inverter during a first discharging phase to bring about a coil current in a negative direction through the second capacitor and through the primary coil;
prompt the first inverter during a second discharging phase to bring about a coil current in the negative direction through the first capacitor and through the primary coil; and
adapt a duration of the first and/or the second discharging phase based on the capacitance information item.

5. The primary unit according to claim 4, wherein the control unit is further configured to:
bring about a freewheeling phase between a charging phase and a subsequent discharging phase or between a discharging phase and a subsequent charging phase, during which freewheeling phase the first and second inverters are not driven so as to reduce an amplitude of the coil current in terms of magnitude.

6. A primary unit for an inductive charging system configured to transfer energy from the primary unit to a secondary unit via a magnetic field, comprising:
a primary coil configured to generate the magnetic field in response to a coil current through the primary coil, wherein the magnetic field and the coil current have a specific frequency;
a first inverter coupled to the primary coil via a first capacitor and configured to charge or discharge the first capacitor based on a first input voltage;
a second inverter coupled to the primary coil via a second capacitor and configured to charge or discharge the second capacitor based on a second input voltage; and
a control unit configured to:
ascertain a capacitance information item with respect to an effective capacitance of a primary resonant circuit of the primary unit, wherein the primary resonant circuit comprises the primary coil;
drive the first inverter and the second inverter based on the capacitance information item in order to bring about the coil current through the primary coil and to set the effective capacitance of the primary resonant circuit of the primary unit;
drive the first inverter and the second inverter cyclically in a sequence of different phases such that the sequence of different phases is repeated at the specific frequency; and
bring about a freewheeling phase between a charging phase and a subsequent discharging phase or between a discharging phase and a subsequent charging phase, during which freewheeling phase the first and second inverters are not driven so as to reduce an amplitude of the coil current in terms of magnitude,
wherein the sequence of phases comprises the first charging phase, the second charging phase, a freewheeling phase, the first discharging phase, the second discharging phase and a freewheeling phase.

7. The primary unit according to claim 1, wherein
the first capacitor is coupled in series with the primary coil;
the second capacitor is coupled in series with the primary coil;
the first capacitor is coupled to the primary coil via the second capacitor;
the first capacitor comprises a first partial capacitor, which is coupled to a first side of the primary coil, and a second partial capacitor, which is coupled to a second side of the primary coil; and/or
an output of the first inverter is coupled to an output of the second inverter via the first capacitor.

8. A primary unit for an inductive charging system configured to transfer energy from the primary unit to a secondary unit via a magnetic field, comprising:
a primary coil configured to generate the magnetic field in response to a coil current through the primary coil;
a first inverter coupled to the primary coil via a first capacitor and configured to charge or discharge the first capacitor based on a first input voltage;
a second inverter coupled to the primary coil via a second capacitor and configured to charge or discharge the second capacitor based on a second input voltage; and
a control unit configured to:
ascertain a capacitance information item with respect to an effective capacitance of a primary resonant circuit of the primary unit, wherein the primary resonant circuit comprises the primary coil; and
drive the first inverter and the second inverter based on the capacitance information item in order to bring about the coil current through the primary coil and to set the effective capacitance of the primary resonant circuit of the primary unit, wherein:
the first capacitor is coupled to the primary coil via the second capacitor;
an output of the first inverter is coupled to an output of the second inverter via the first capacitor; and
a capacitance of the second capacitor is such that a voltage at the output of the second inverter does not exceed the second input voltage.

9. The primary unit according to claim 1, wherein
the first inverter comprises a first full bridge and the second inverter comprises a second full bridge;
the first full bridge and the second full bridge each comprise semiconductor-based switching elements; and/or
the switching elements each comprise a flyback diode.

10. A method for operating a primary unit of an inductive charging system configured to transfer energy from the primary unit to a secondary unit via a magnetic field; wherein
the primary unit comprises a primary coil configured to generate the magnetic field in response to a coil current through the primary coil;
the primary unit comprises a first inverter coupled to the primary coil by a first capacitor and configured to charge or discharge the first capacitor based on a first input voltage; and
the primary unit comprises a second inverter coupled to the primary coil via a second capacitor and configured to charge or discharge the second capacitor based on a second input voltage;
the method comprising:
ascertaining a capacitance information item in relation to an effective capacitance of a primary resonant circuit of the primary unit, wherein the primary resonant circuit comprises the primary coil;

driving the first inverter and the second inverter based on the capacitance information item in order to bring about the coil current through the primary coil and to set the effective capacitance of the primary resonant circuit of the primary unit;

prompting the second inverter during a first charging phase to bring about a coil current in a positive direction through the second capacitor and through the primary coil;

prompting the first inverter during a second charging phase to bring about a coil current in the positive direction through the first capacitor and through the primary coil; and adapting a duration of the first and/or the second charging phase based on the capacitance information item.

* * * * *